United States Patent [19]

Gaul

[11] Patent Number: 4,964,287
[45] Date of Patent: Oct. 23, 1990

[54] QUICK-RELEASE BICYCLE AXLE ASSEMBLY

[76] Inventor: Richard K. Gaul, 1901B E. Washington St., Urbana, Ill. 61801

[21] Appl. No.: 281,703

[22] Filed: Dec. 9, 1988

[51] Int. Cl.⁵ ............................................. E05B 71/00
[52] U.S. Cl. ...................................... 70/233; 70/226; 301/111
[58] Field of Search ................. 70/181, 204, 210, 225, 70/226, 230, 233, 259; 301/111, 114, 124 R, 125

[56] References Cited

U.S. PATENT DOCUMENTS

| | | | |
|---|---|---|---|
| 3,877,261 | 4/1975 | Robins | 70/181 X |
| 3,988,910 | 11/1976 | Widev | 70/226 X |
| 4,028,915 | 6/1977 | Stahl | 70/210 X |
| 4,079,958 | 3/1978 | Segawa | 301/111 X |
| 4,114,409 | 9/1978 | Scire | 70/225 |
| 4,180,998 | 1/1980 | Hellman | 70/233 X |
| 4,400,038 | 8/1983 | Hosokawa | 301/125 X |
| 4,621,873 | 11/1986 | Weinstein et al. | 70/225 X |
| 4,724,692 | 2/1988 | Turin et al. | 70/225 |
| 4,770,011 | 9/1988 | Constant | 70/225 |
| 4,789,206 | 12/1988 | Ozaki | 301/111 |

FOREIGN PATENT DOCUMENTS 2221329 10/1974 France .................................. 70/225

*Primary Examiner*—Gary L. Smith
*Assistant Examiner*—Suzanne L. Dino

*Attorney, Agent, or Firm*—Sixbey, Friedman, Leedom & Ferguson

[57] ABSTRACT

An apparatus 10 is provided for connecting a wheel to a bicycle frame 14. In particular, a hub 16 is rotatably connected to the fork portion 12 of the bicycle frame 14. A drawbar 18 acting as an axle passes through a central longitudinal bore in hub 16 and is captured at each end respectively by a cap nut 38 and housing 36. Intermediate the cap nut 38 and fork 12 is a lockdown washer 28. Lockdown washer 28 includes a raised portion extending within the fork portion 12 whereby rotation therebetween is prevented. A raised knurled portion extends longitudinally from the lockdown washer 28 and mates with a corresponding recessed knurled portion within the cap nut 38. Correspondingly, between the housing 36 and fork portion 12, a second lockdown washer 26 is disposed. The lockdown washer 26 also includes a raised portion 30 extending into the frame 12 whereby rotation is prevented therebetween. A raised knurled surface extends longitudinally from the lockdown washer 26 and mates with a corresponding recessed knurled surface in the housing 36. A cam 40 operates to displace the drawbar 18 between first and second preselected longitudinal locations whereby the cap nut 38 and lockdown washer 28, as well as the housing 36 and lockdown washer 26 are compressed against the forks 12 and capture the apparatus 10 against the forks 12.

4 Claims, 3 Drawing Sheets

QUICK-RELEASE BICYCLE AXLE ASSEMBLY

BACKGROUND OF THE INVENTION

1. Field of the Invention

This invention relates generally to a quick-release axle assembly for attaching a bicycle wheel to a bicycle frame, and more particularly, to a quick-release axle assembly that is simple and easy to use and provides a more positive connection between the bicycle wheel and frame.

2. Description of the Related Art

In the past, bicycles have employed various devices designed to allow the bicycle wheels to be quickly and easily removed. This quick-change capability facilitated changing flat tires and operated as a security measure to prevent theft of such wheels. However, a common problem associated with these quick-release devices is that they occasionally and quite unexpectedly tend to release the wheel from the bicycle frame at less then optimal times. This unexpected loss of the bicycle wheel leads to loss of control and, ultimately, an accident.

Accordingly, it is desirable that a quick release axle assembly be capable of quickly and simply releasing the wheel from the frame, but still provide a positive connection between the wheel and the frame to avoid gradual loosening of the connection, and sudden, unexpected separation of the wheel and frame.

The present invention is directed to overcoming one or more of the problems as set forth above.

SUMMARY OF THE INVENTION

The primary object of the present invention is to provide a quick-release axle assembly that requires a small amount of force to positively interconnect the frame and axle.

Another object of the present invention is to provide a quick release axle assembly that includes a locking mechanism that is small and lightweight, and yet positively locks the axle and frame to prevent undesirable separation and theft thereof.

To attain these and other objectives an apparatus is provided for rotatably securing a wheel to a fork portion of a bicycle frame. The apparatus includes a hub having first and second end portions and a bore extending axially therethrough. A drawbar has first and second end portions and is positioned extending through the axial hub bore. The drawbar first end portion extends past the hub first end portion and is threaded, while the drawbar second end portion extends past the hub second end portion and has a bore extending transversely therethrough. First and second lock washers have a central bore extending therethrough and are respectively positioned about and adjacent the first and second drawbar end portions. Each of the lockdown washers has a raised portion extending therefrom into said fork portion whereby relative rotation therebetween is prevented, and a raised, knurled portion is disposed about the inner periphery of the central bore and extends in a direction generally away from the hub. A cap nut has a central bore threadably attached to the drawbar first end portion and a recessed knurled portion adapted to mate with the raised, knurled portion of the first lockdown washer. A housing has a central bore disposed about the second end portion of the drawbar, a recessed, knurled portion extending about the periphery of the housing bore and adapted to mate with the raised, knurled portion of the second lockdown washer, and a second bore generally orthogonal to and connected with the housing central bore. A cam extends through the housing second bore and into said transverse drawbar bore whereby rotation of said cam produces longitudinal movement of said drawbar between a first and second preselected positions.

In another aspect of the invention an apparatus is provided for rotatably securing a wheel to a fork portion of a bicycle frame. The apparatus includes a hub having first and second end portions and a bore extending axially therethrough. A drawbar has first and second end portions and is positioned extending through the axial hub bore. The drawbar first end portion extends past the hub first end portion and is threaded, while the drawbar second end portion extends past the hub second end portion and has a bore extending transversely therethrough. First and second lock washers have a central bore extending therethrough and are connected to the fork portion of the frame and respectively positioned about and adjacent the first and second drawbar end portions. Each of the lockdown washers has a raised portion extending therefrom into said fork portion whereby relative rotation therebetween is prevented, and a raised, knurled portion is disposed about the inner periphery of the central bore and extends in a direction generally away from the hub. The first and second lockdown washers are of an open toroidal configuration wherein the magnitude of the toroidal opening is greater than the drawbar diameter. A cap nut has a central bore threadably attached to the drawbar first end portion and a recessed knurled portion adapted to mate with the raised, knurled portion of the first lockdown washer. A housing has a central bore disposed about the second end portion of the drawbar, a recessed, knurled portion extending about the periphery of the housing bore and adapted to mate with the raised, knurled portion of the second lockdown washer, and a second bore generally orthogonal to and connected with the housing central bore. A cam extends through the housing second bore and into said transverse drawbar bore whereby rotation of said cam produces longitudinal movement of said drawbar between a first and second preselected positions.

BRIEF DESCRIPTION OF THE DRAWINGS

Other objects and advantages of the invention will become apparent upon reading the following detailed description and upon reference to the drawings in which.

Figure 1:
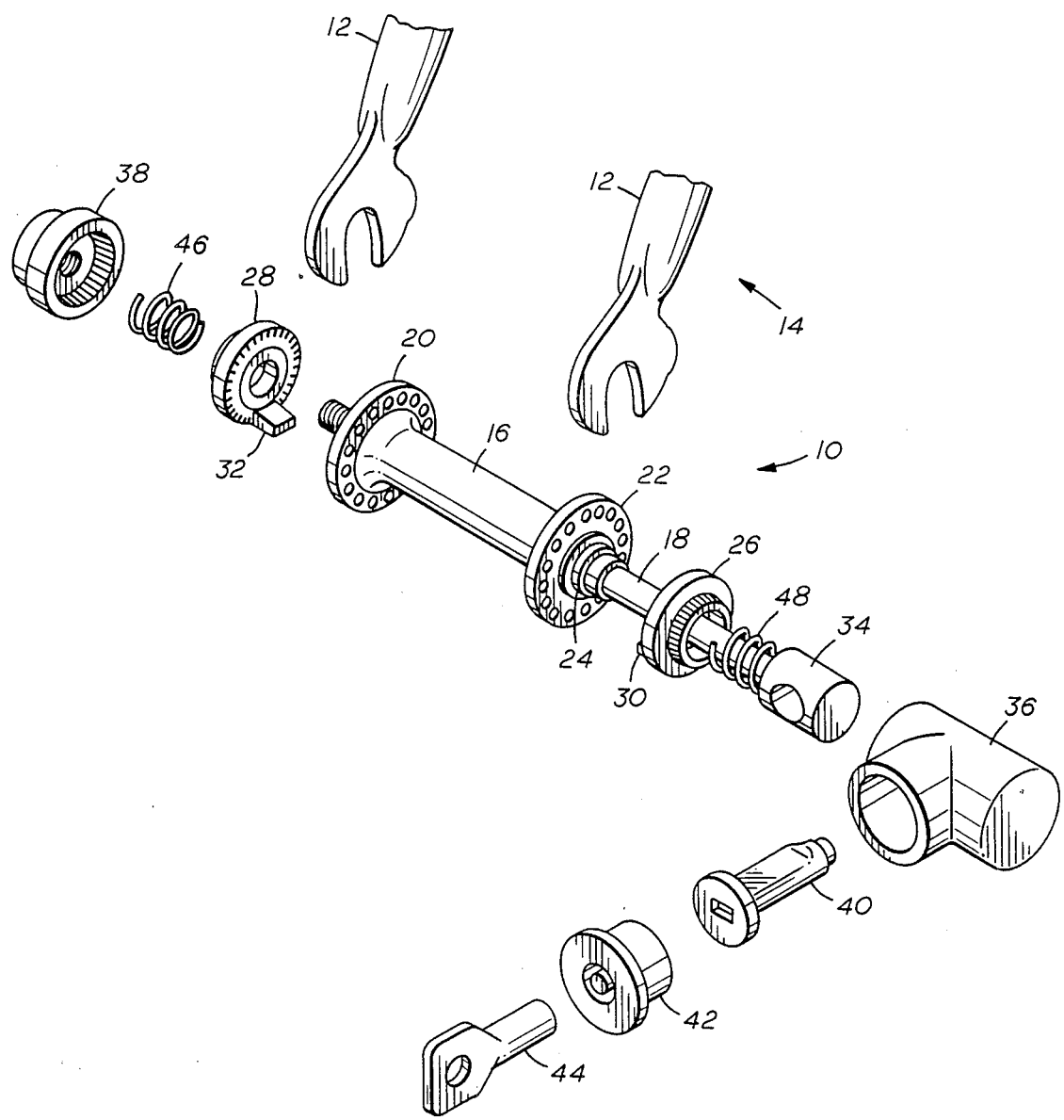
FIG. 1 is perspective view of a first embodiment of the instant apparatus.

While the invention is susceptible to various modifications and alternative forms, specific embodiments thereof have been shown by way of example in the drawings and will herein will be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Turning now to the drawings and referring first to FIG. 1, an exploded perspective view of the apparatus 10 relative to a fork portion 12 of a bicycle frame 14 is shown. A better appreciation of the construction of apparatus 10 may be had by simultaneously referring to the longitudinal cross section of the assembled apparatus 10 and fork portion 12 shown in FIG. 2. Throughout the drawings identical reference numerals have been assigned to common parts.

A central hub 16 includes a bore longitudinally extending therethrough and being of a size sufficient to accept a drawbar 18 acting as an axle. The hub 16 is of a conventional design and includes flanged portions 20, 22 at longitudinally opposite ends thereof. The outer periphery of the flange portions 20, 22 include a series of axial bores passing therethrough for accepting the end portions of a plurality of spokes (not shown) to support the rim portion of the bicycle wheel.

When the axle assembly 10 is combined with the forks 12, the axially outward surfaces of the flanges 20, 22 are in close proximity to the interior surfaces of the forks 12. Of course, the hub 16 is free to rotate about the longitudinal axis relative to the forks 12, and consequently, does not engage the interior surfaces of the forks 12. Rather, the drawbar 18 is supported by ball bearing arrangements (not shown) interior to the hub 16.

A race 24 is also supported by the ball bearings and presents a surface that engages the interior surfaces of the forks 12. The race 24 is fixed relative to the forks 12, thereby allowing the hub 16 to rotate relative to the drawbar 18.

A pair of lock down washers 26, 28 include a central bore longitudinally extending therethrough for accepting the drawbar 18. The interior surfaces of the lockdown washers 26, 28 engage the exterior surfaces of the forks 12 and frictionally capture the forks 12 between the race 24 and lockdown washers 26, 28. Therefore, it can be seen that the drawbar 18, race 24, and lockdown washers 26, 28 are fixed relative to the forks 12 while the hub 16 is allowed to rotate.

The lockdown washers 26, 28 include raised portions 30, 32 extending longitudinally inward and mating with openings in the bicycle forks 12. The raised portions 30, 32 prevent rotation of the lockdown washers 26, 28 by physically extending inward into the openings in the forks 12. Therefore, any rotation experienced by the lockdown washers 26, 28 results in the raised portions 30, 32 engaging the interior sidewalls of the openings in the forks 12.

The drawbar 18 includes first and second end portions wherein the first end portion includes threads formed thereon, and the second end portion is fixedly attached to a head element 34. The head element 34 is generally cylindrical in shape with one end portion of the cylinder connected to the drawbar 18. A radial bore passes through the sidewalls of the head element 34 and, as subsequently described herein operates to tension the drawbar 18 and functionally engage the lockdown washers 26, 18 with the forks 12.

Figure 2:
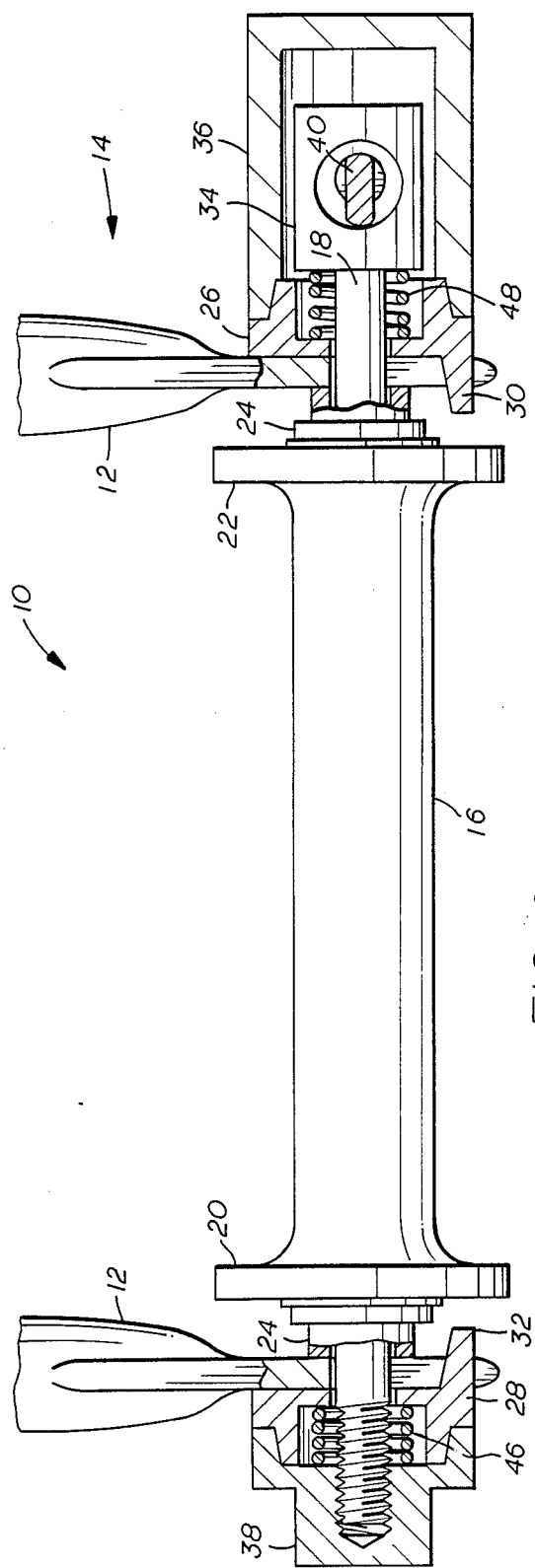
FIG. 2 is a longitudinal view of the instant apparatus shown partially in cross section.

A housing 36 is formed from a pair orthogonally disposed cylinders, each having a central bore passing coaxially therethrough. One of the central bores receives the head element 34 therein. The housing 36 is designed to mate with the lockdown washer 26. The lockdown washer 26 includes a central raised portion with a knurled outer surface thereon that extends into the housing 36. Correspondingly, the housing 36 includes a recessed surface extending about the periphery of the bore therein and having a matching knurled surface impressed therein. Therefore, it can be seen that when the housing 36 and lockdown washer 26 are assembled, as shown in FIG. 2, they are fixed against rotation therebetween.

Similarly, a cap nut 38 includes a central bore extending therein and having a threaded portion that matches the threaded first end portion of the drawbar 18. Further, the cap nut 38 also includes a recessed knurled surface matching a correspondingly raised knurled surface on the lockdown washer 28. Accordingly, when assembled, as shown in FIG. 2, the drawbar 18 extends into the threaded borehole of the cap nut 38 and the matching knurled surfaces of the cap nut 38 and lockdown washer 28 mate together to prevent rotation therebetween.

A cam 40 extends through the second bore of the housing 36 and intersects the radial bore of the head element 34. The cam 40 is generally cylindrical in shape with a planar surface cut on one longitudinal face thereof. Accordingly, it can be seen that when the cam 40 is rotated to a first position, such that the generally planar surface faces away from the hub 16, the head element 34 is free to move a small distance toward the hub 16. Conversely, rotation of the cam 40 to a second position, such that the generally planar surface faces toward the hub 16, causes the head element radial bore to contact the generally cylindrical surface of the cam 40 and force the head element 34 a small distance in a direction away from the hub 16. Therefore, by adjusting the longitudinal position of the cap nut 38 on the drawbar 18, the amount of free play between the lockdown washers 26, 28 and the forks 12 is matched to the longitudinal movement created by rotation of the cam 40. Thus, rotation of the cam 40 to the first position releases the apparatus 10 from the forks 12, while rotation of the cam 40 to the second position frictionally engages the lock washers 26, 28 with the forks 12 and securely attaches the hub assembly 16 to the frame 14.

A lock assembly 42 is selected to have an outer diameter that matches the second bore of the housing 36, such that the lock assembly 42 mates with the cam 40. Therefore, operation of the standard lock assembly 42 causes similar rotation in the cam 40. A standard key 44, such as a tubular key, operates the lock assembly 42 and rotates the lock assembly 42 and cam 40 between the first and second positions.

Coil springs 46, 48 are respectively disposed between the cap nut 38 and lockdown washer 28 and the lockdown washer 26 and cylindrical head element 34. The coil springs 46, 48 act to separate the knurled surfaces of the lockdown washers 26, 28 from the respective cap nut 38 and housing 36 when the cam 40 is located in its second position, such that the apparatus 10 is removable from the forks 12. Alternatively, when the cam 40 is in its first position, such that the apparatus 10 is assembled with the forks 12, the coil springs 46, 48 are compressed and disposed within a cylindrical chamber respectively defined between the lockdown washers 46, 48, cap nut 38, and housing 36. The springs 46, 48, therefor, separate the knurled surfaces so that adjustment of the cap nut 38, by further threading onto the drawbar 18, can be effected.

The function and operation of the springs 46, 48 may best be understood by a description of the procedure of assembling the apparatus 10 with the forks 12. The apparatus 10 is first positioned with the hub 16 located between the forks 12. The cap nut 38 is then threaded onto the drawbar 18 to a position such that the housing 36 and cap nut 38 are displaced from their respective lockdown washers 26, 28 by a distance slightly less than the distance that cam 40 will produce in the drawbar 18 by movement from its first to second position. Thereafter, rotation of the lock assembly 42 and cam 40 pulls the drawbar 18 in a direction toward the housing 36. The cap nut 38 moves with the drawbar 18 until the knurled surfaces of the cap nut 38 fully engages the lockdown washer 28. At the same time, the housing 36 moves toward the lockdown washer 26 until their corresponding knurled surfaces are similarly fully engaged. At this time installation of the apparatus 10 to the forks 12 is complete.

It should be understood that this procedure is only necessary for the first installation of the apparatus 10. Thereafter, the cap nut 38 need not be adjusted since it has already been placed in the desired longitudinal position.

Figure 4:
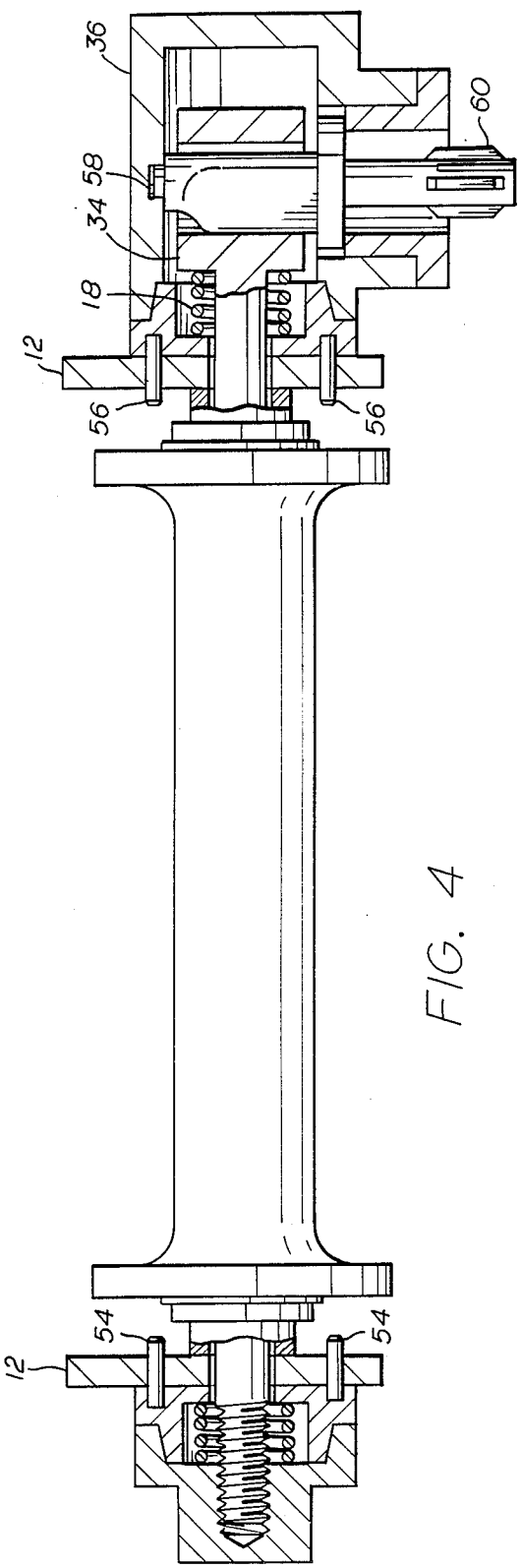
FIG. 4 is a longitudinal view of the instant apparatus shown partially in cross section.
Figure 3:
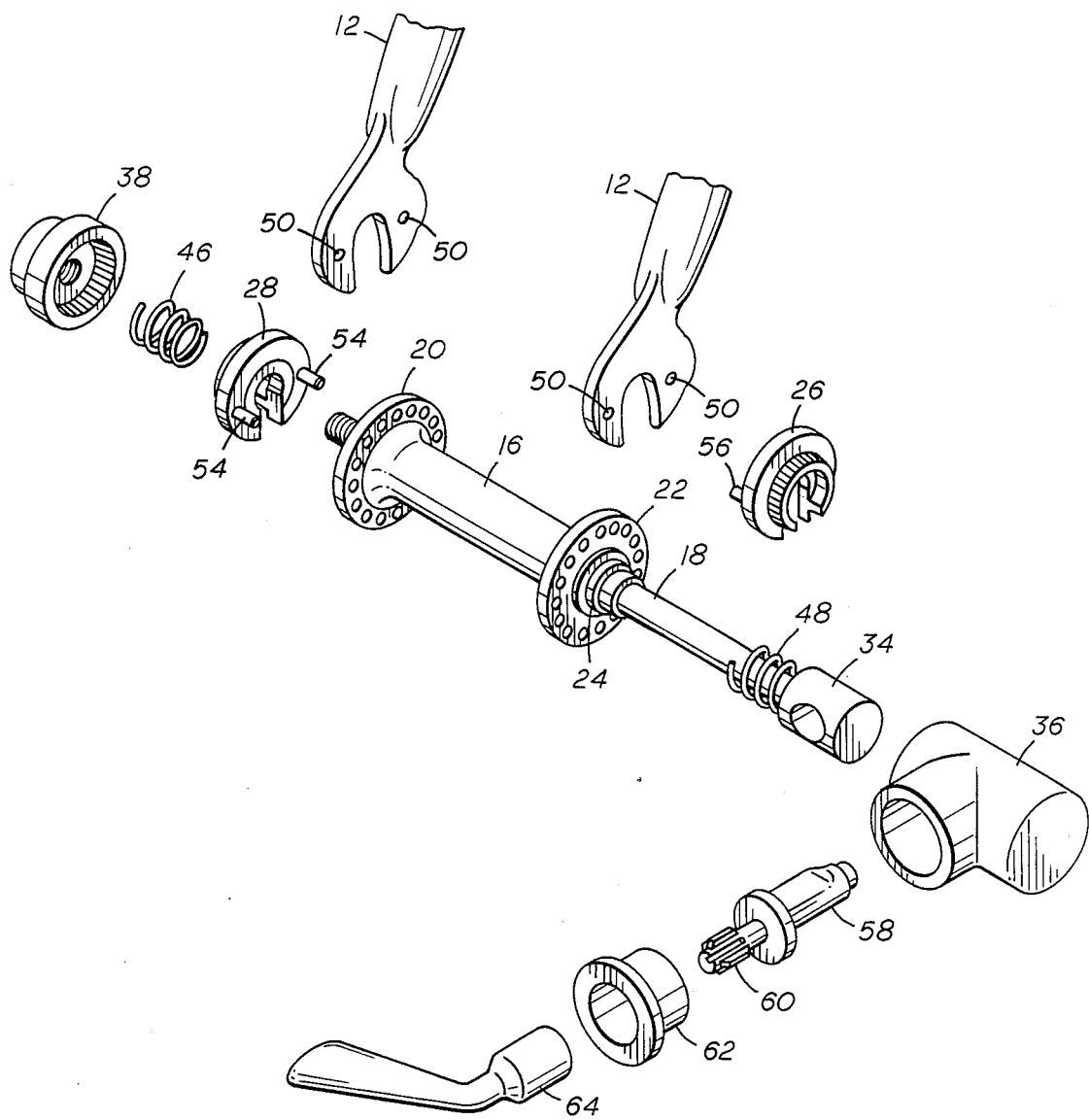
FIG. 3 is a perspective view of another embodiment of the instant apparatus.

Referring now to FIG. 3, a perspective view of a second embodiment of the apparatus 10 relative to fork portions 12 of bicycle frame 14 is shown. A better appreciation of the construction of apparatus 10 may be had by simultaneously referring to the longitudinal cross section of the assembled apparatus 10 and fork portion 12 shown in FIG. 4. Throughout the drawings identical reference numerals have been assigned to common parts.

The second embodiment of the apparatus 10 differs from the first embodiment in two significant respects. First, the key operated lock assembly 42 has been replaced by a standard lever operated mechanism. The cam 40 has been replaced by a cam 58 that includes a shaft 60 extending relatively coaxial with the cam 58. The shaft 60 includes raised surfaces disposed about the periphery of the shaft 60. A retaining collar 62 fits within the second bore of the housing 36 and captures the cam 58 against removal therefrom. The collar 62 can be fixed to the housing 36 by various known methods, such as blind hole pinning, welding, gluing, braising, etc. The shaft 60, with the raised portions thereon, extends through the collar 62 and mates with a corresponding bore in a lever 64. Therefore, operation of the lever 64 between first and second positions similarly moves the cam 58 between its first and second positions.

The second aspect of the differences between the first and second embodiments is that the lockdown washers 26, 28 are designed to be fixedly attached to the forks 12. Therefore, in order remove the apparatus 10 from the bicycle frame 14 slots have been provided in the lockdown washers 26 and 28. The slots have a dimension slightly greater then the diameter of the drawbar 18, to allow the drawbar 18 to pass therethrough. Further, the lockdown washers 26, 28 include guide pins 54, 56 extending longitudinally therefrom and mating with corresponding boreholes 50, 52 within the forks 12. Alternatively, the lockdown washers 26, 28 may also be fixedly attached the forks 12 by a variety of methods, such as welding, braising, or integral formation therewith.

In this embodiment, the apparatus 10 is assembled with the forks 12, such that frictional interaction between the lockdown washers 26, 28 and the forks 12 is not the only force holding the apparatus 10 and forks 12 in the assembled position. Rather, since the lockdown washers 26, 28 are fixedly attached to the forks 12, the knurled surfaces of the lockdown washers 26, 28, cap nut 38 and housing 36 interact to capture the apparatus 10 to the forks 12. It can be seen that relatively little force is required to engage the matched knurled surfaces of the housing 36, cap nut 38, and lockdown washers 26, 28.

It should be appreciated that the lock assembly 42 can be readily substituted for the lever 64 in the second embodiment to provide an apparatus 10 that is secured against theft, as well as being more positively connected to the forks 12.

I claim:

1. An apparatus for rotatably securing a wheel to a fork portion of a bicycle frame, comprising:

a hub having first and second end portions and a bore extending axially therethrough;

a drawbar having first and second end portions and being positioned extending through the axial hub bore, said drawbar first end portion extending past the hub first end portion and being threaded, said drawbar second end portion extending past the hub second end portion and having a bore extending transversely therethrough;

first and second lock washers having a central bore extending therethrough and being connected to the fork portion of said frame and respectively positioned about and adjacent said first and second drawbar end portions, each of said lockdown washers having a raised portion extending therefrom into said fork portion whereby relative rotation therebetween is prevented, and a raised, knurled portion disposed about the inner periphery of said central bore and extending in a direction generally away from said hub, said first and second lockdown washers being of an open toroidal configuration wherein the magnitude of the toroidal opening is greater than the drawbar diameter;

a cap nut having a central bore threadably attached to the drawbar first end portion and a recessed knurled portion adapted to mate with the raised, knurled portion of said first lockdown washers;

a housing having a central bore disposed about the second end position of said drawbar, a recessed, knurled portion extending about the periphery of said housing bore and adapted to mate with the raised, knurled portion of said second lockdown washer, and a second bore generally orthogonal to and connected with said housing central bore;

a cam extending through said housing second bore and into said transverse drawbar bore whereby rotation of said cam produces longitudinal movement of said drawbar between a first and second preselected positions.

2. An apparatus, as set forth in claim 1, including first and second coil springs disposed about said drawbar respectively intermediate said first lockdown washer and said cap nut and said second cap nut and said housing.

3. An apparatus, as set forth in claim 1, including a lock assembly disposed in said housing second bore and rotatably connected to said cam, said cam and lock assembly being rotatable in unison to effect longitudinal movement of said drawbar between the first and second preselected positions.

4. An apparatus, as set forth in claim 1, wherein said fork portions include at least one bore extending transversely therethrough and said first and second lockdown washers have a pin extending transversely therefrom and engaging said fork portion bore.

* * * * *